United States Patent
Lee (10) Patent No.: US 9,418,412 B2
(45) Date of Patent: Aug. 16, 2016

(54) INSPECTION SYSTEM

(71) Applicant: British American Tobacco Korea Manufacturing Limited, Sacheon (KR)

(72) Inventor: Jongmyung Lee, Sacheon (KR)

(73) Assignee: BRITISH AMERICAN TOBACCO KOREA MANUFACTURING LIMITED (KR)

( * ) Notice: Subject to any disclaimer, the term of this patent is extended or adjusted under 35 U.S.C. 154(b) by 0 days.

(21) Appl. No.: 14/653,926

(22) PCT Filed: Dec. 19, 2013

(86) PCT No.: PCT/GB2013/053352
§ 371 (c)(1),
(2) Date: Jun. 19, 2015

(87) PCT Pub. No.: WO2014/096824
PCT Pub. Date: Jun. 26, 2014

(65) Prior Publication Data
US 2015/0348256 A1 Dec. 3, 2015

(30) Foreign Application Priority Data
Dec. 21, 2012 (GB) .................................. 1223176.7

(51) Int. Cl.
*G06T 7/00* (2006.01)
*H04N 5/335* (2011.01)
(Continued)

(52) U.S. Cl.
CPC ............... *G06T 7/0004* (2013.01); *A24C 5/345* (2013.01); *A24C 5/3412* (2013.01); *H04N 5/235* (2013.01);
(Continued)

(58) Field of Classification Search
CPC ...... A24C 5/3412; A24C 5/471; A24C 5/005; A24C 5/34; A24C 5/345; A24C 5/586; A24C 5/00; G06T 7/0004; G06T 2207/30108; G06T 2207/10016; G01N 2021/845; G01N 21/8806; G01N 21/909; G01N 33/34; G01N 21/952; B07C 5/3422; B07C 5/34; B07C 5/3412; Y10S 131/906; Y10S 131/907; Y10S 131/908
See application file for complete search history.

(56) References Cited

U.S. PATENT DOCUMENTS 4,112,954 A * 9/1978 Preston .................. A24C 5/471
131/60
5,223,915 A 6/1993 Neri
(Continued)

FOREIGN PATENT DOCUMENTS

DE 3030140 3/1982
EP 1783080 5/2007
(Continued)

OTHER PUBLICATIONS

UK Intellectual Property Office; Search Report under Section 17(5); 2013; UK May 22, 2013.
(Continued)

*Primary Examiner* — Kim Vu
*Assistant Examiner* — Michael Vanchy, Jr.
(74) *Attorney, Agent, or Firm* — Cantor Colburn LLP (57) ABSTRACT

An imaging module takes an image of an area which includes the tipping paper, the filter and the cigarette roll of a smoking article seated on the rolling drum. A processing module processes the image taken by the imaging module. The area of the image taken by the imaging module is divided into a first area in which the tipping paper is positioned and a second area in which the filter is positioned. The processing module determines a defect by detecting the image on the first area and the second area.

17 Claims, 8 Drawing Sheets

(51) Int. Cl.
    *H04N 7/18*       (2006.01)
    *H04N 5/235*      (2006.01)
    *A24C 5/34*       (2006.01)
    *A24C 5/345*      (2006.01)

(52) U.S. Cl.
    CPC ............... *H04N 5/335* (2013.01); *H04N 7/18* (2013.01); *G06T 2207/10004* (2013.01); *G06T 2207/30108* (2013.01); *G06T 2207/30168* (2013.01)

(56) References Cited

U.S. PATENT DOCUMENTS

| | | | |
|---|---|---|---|
| 5,432,600 A | | 7/1995 | Grollimund et al. |
| 6,075,882 A | * | 6/2000 | Mullins ................ A24C 5/3412 131/280 |
| 2007/0229827 A1 | | 10/2007 | Gast |

FOREIGN PATENT DOCUMENTS

| | | |
|---|---|---|
| EP | 2568279 | 9/2012 |
| EP | 2505994 | 10/2012 |
| JP | 2002148204 | 5/2002 |
| WO | 2004083834 | 9/2004 |
| WO | 2012117499 | 9/2012 |

OTHER PUBLICATIONS

International Search Authority; Notification of Transmittal of the International Search Report and the Written Opinion; Mar. 2014; NL Mar. 20, 2014.

International Preliminary Examining Authority; Written Opinion of the International Preliminary Examining Authority; Dec. 2014; Munich Mar. 12, 2014.

International Preliminary Examining Authority; Written Opinion of the International PreliminaryExamining Authority; Apr. 2015; Munich Apr. 8, 2015.

International Preliminary Examining Authority; Notification of Transmittal of the International Preliminary Report on Patentability; May 2015; Munich May 29, 2015.

* cited by examiner

FIG. 11

INSPECTION SYSTEM

TECHNICAL FIELD

The present invention relates to an inspection system, and more particularly, to a smoking article inspection system with which a defective smoking article can be discriminated and discharged during the manufacturing process.

BACKGROUND

Various types of defects may occur in the automated manufacturing process of smoking articles, and methods for inspecting defects during the manufacturing process have been considered in order to prevent defective smoking articles from being packed and supplied to a consumer.

SUMMARY

Various aspects of the present invention provide an inspection system which can carry out discriminative inspection of various types of defects which occur in the process by which a tipping paper is coupled and detect the individual defects depending on the respective reasons for the defects, so that the defects can be effectively and correctly detected.

In an aspect of the present invention, there is provided an inspection system comprising: an imaging module configured to generate an image of a plurality of rod articles and/or a wrapping material for wrapping and coupling the rod articles, a processing module configured to process images generated by the imaging module, wherein the processing module is configured to analyse images in a first area in which the wrapping material is positioned and/or a second area in which a said rod article is positioned, and, the processing module is configured to determine a defect by analysing the first area and/or the second area.

In an aspect of the present invention, there is provided a cigarette inspection system that includes a tipping drum on which a paper web is cut at predetermined intervals, thereby forming tipping papers; a rolling drum which receives the filter and the cigarette roll from the swash drum, the tipping paper wrapping and coupling the filter and the cigarette roll together; an imaging module which takes an image of an area which includes the tipping paper, the filter and the cigarette roll seated on the rolling drum; and a processing module which processes the image taken by the imaging module. The area of the image taken by the imaging module is divided into a first area in which the tipping paper is positioned and a second area in which the filter is positioned, and the processing module determines a defect by detecting the image on the first area and the second area.

In an exemplary embodiment, the system comprises a swash drum which supplies a filter and a cigarette roll which are seated on the swash drum while maintaining a predetermined interval from each other.

In an exemplary embodiment, the first area may be divided into a first normal area in which the tipping paper is in a normal state and a first error area around the first normal area.

In an exemplary embodiment, the processing module may determine an alignment defect or a double patch when part of the image of the first error area corresponds to the tipping paper.

In an exemplary embodiment, the processing module may determine a foreign matter defect when part of the image of the first normal area has lower brightness than the tipping paper.

In an exemplary embodiment, the processing module may determine a defect when part of the image of the second area has different brightness than the image of the filter.

In an exemplary embodiment, the second area may include a second central area which comprises a central portion of the image of the second area and a second peripheral area which comprises a peripheral portion of the image of the second area.

In an exemplary embodiment, the processing module may determine a filter contains foreign matter when all or part of the image of the second central area has lower brightness than the image of the filter which is normal.

In an exemplary embodiment, the processing module may determine filter omission when all or part of the image of the second peripheral area corresponds to the rolling drum or has lower brightness than the image of the filter which is normal.

According to embodiments of the invention, the images of a tipping paper, a filter and a cigarette roll are photographed when they are positioned on a rolling drum which continuously rotates. It is therefore possible to easily detect a defect which has occurred in the manufacturing process of cigarettes and to discharge defective cigarettes, thereby improving productivity.

According to an embodiment of the invention, there is provided a system comprising: a conveying element configured to receive a plurality of rod articles, and a wrapping material for wrapping and coupling the rod articles; an imaging module configured to generate an image of an area which includes the wrapping material and/or at least a said rod article seated on the conveying element; and a processing module is configured to analyse images in a first area in which the wrapping material is positioned and/or a second area in which a said rod article is positioned, and, wherein the processing module determines a defect by analysing the image on the first area and/or the second area.

According to an embodiment of the invention, there is provided a method of inspecting smoking articles, comprising: generating an image with an imaging module of a plurality of rod articles and/or a wrapping material for wrapping and coupling the rod articles; analysing the area of the image taken by the imaging module in a first area in which the wrapping material is positioned and/or a second area in which the filter is positioned; and determining a defect by analysing the image on the first area and/or the second area.

In an exemplary embodiment, the imaging module generates an image of the wrapping material and/or rod articles on a conveying element directly prior or during wrapping of the wrapping material around the rod articles.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

BRIEF DESCRIPTION OF THE DRAWINGS

Embodiments of the invention will now be described, by way of example only, with reference to accompanying drawings, in which.

DETAILED DESCRIPTION

Reference will now be made in detail to various embodiments of the present invention, examples of which are illustrated in the accompanying drawings and described below. In the following description of the present invention, detailed descriptions of known functions and components incorporated herein will be omitted when they may make the subject matter of the present invention unclear.

Figure 1:
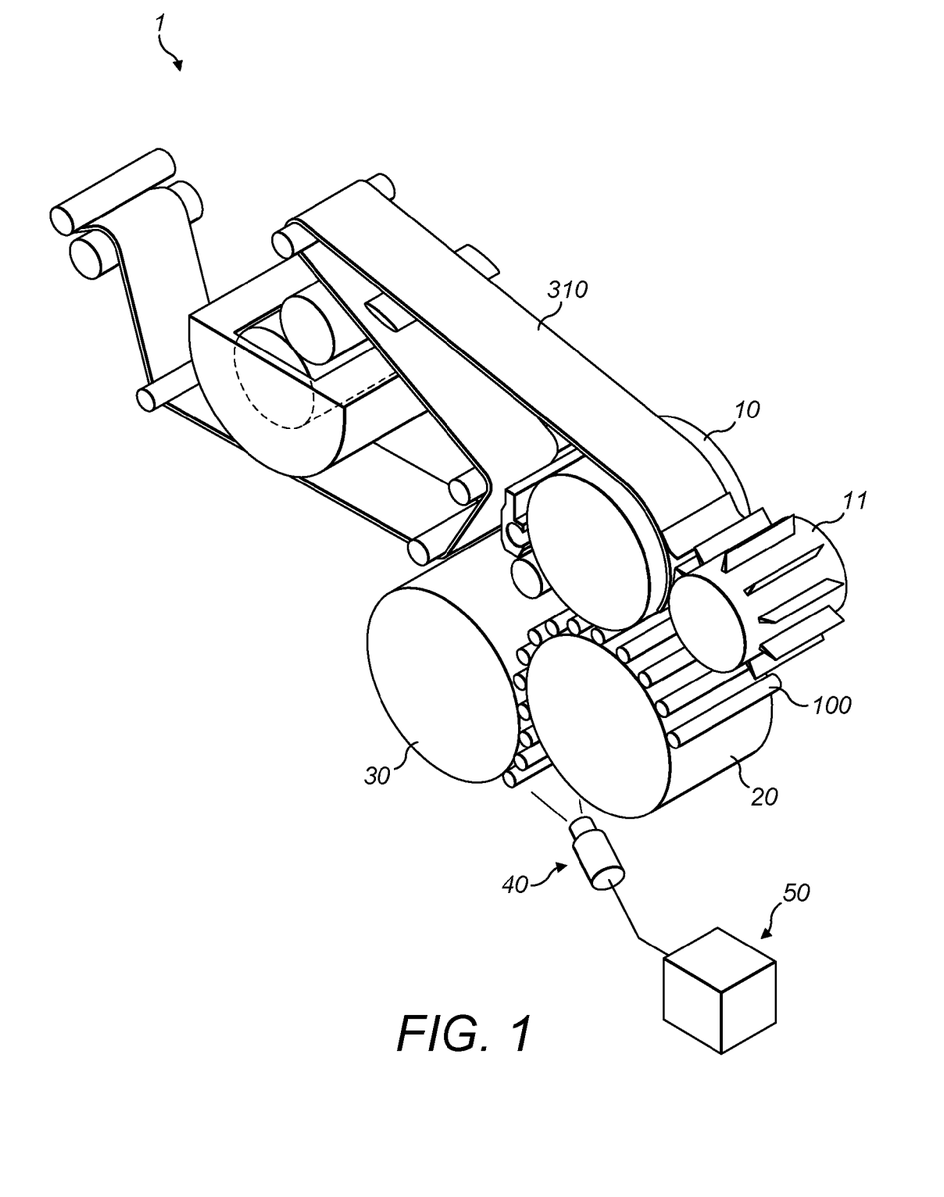
FIG. 1 is a view schematically showing an inspection system according to an embodiment of the invention.
Figure 2:
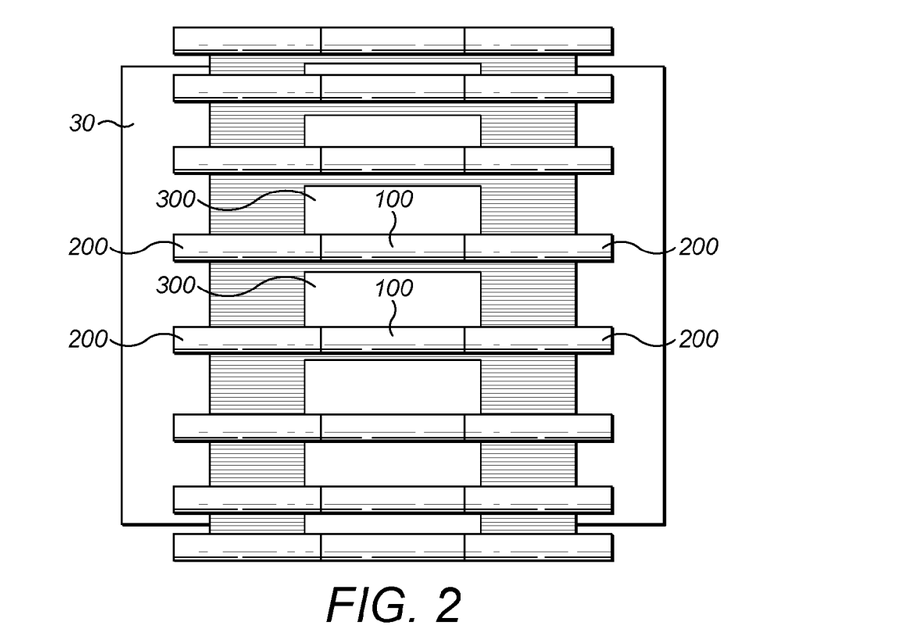
FIG. 2 is front view of a rolling drum shown in FIG. 1.
Figure 3:
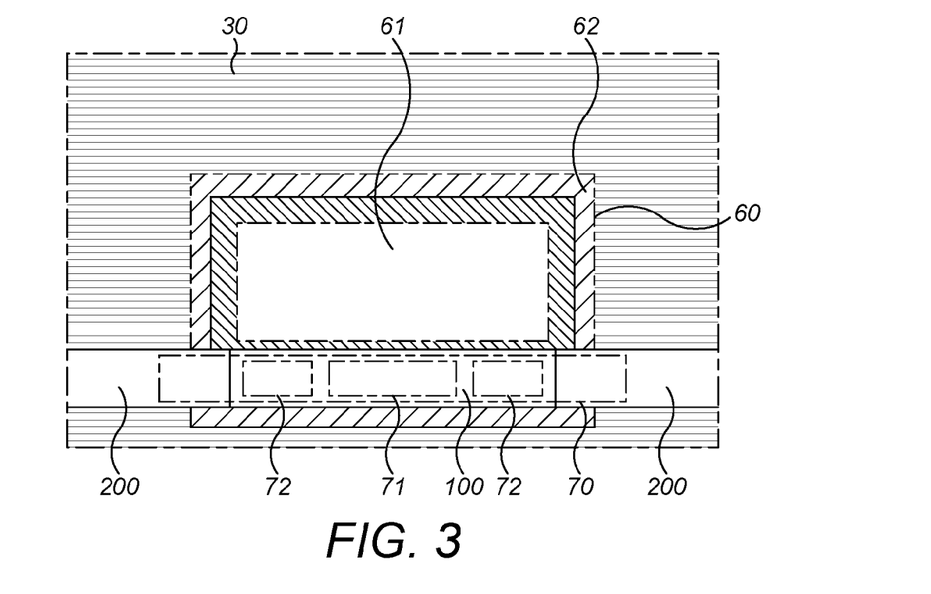
FIG. 3 is a view showing first and second areas on the rolling drum of the inspection system according to an embodiment of the invention.
Figure 4:
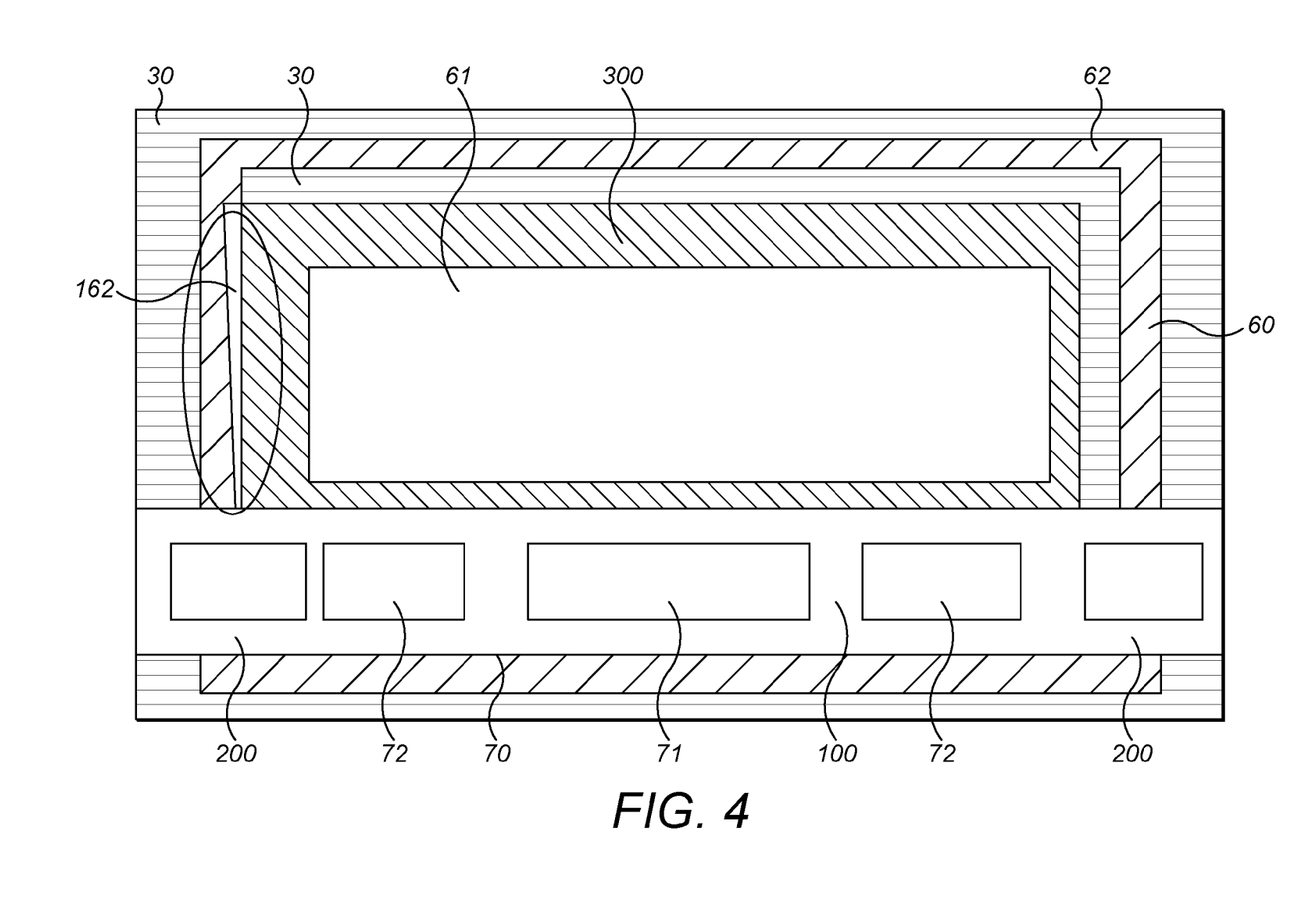
FIG. 4 is a view showing an example of a defect of a component on the rolling drum shown in FIG. 3.

FIG. 1 is a view schematically showing an inspection system 1 according to an embodiment of the invention. FIG. 2 is a front view of a rolling drum 30 shown in FIG. 1, in which components for forming smoking articles are seated. FIG. 3 is a view showing a first area 60 and a second area 70 on the rolling drum 30 of the inspection system 1 according to an embodiment of the invention. The first area 60 and/or second area 70 can be imaged by the inspection system 1 to determine if there is a defect in the components of the smoking article. FIG. 4 is a view showing an example of a defect on the components on the rolling drum 30 shown in FIG. 3.

As used herein, the term "smoking article" includes smokeable products such as cigarettes, cigars and cigarillos whether based on tobacco, tobacco derivatives, expanded tobacco, reconstituted tobacco or tobacco substitutes and also heat-not-burn products (i.e. products in which flavour is generated from a smoking material by the application of heat without causing combustion of the material). Any reference to a cigarette can be replaced by a reference to a smoking article.

The inspection system of the present invention relates to an inspection system which can inspect a variety of defects which may occur in the process of manufacturing a smoking article. The inspection system can be considered a smoking article inspection system. The inspection system 1 is configured to determine if there are defects in coupling a filter 100 and a source of smokable material, e.g. cigarette roll (tobacco rod) 200, together using a tipping paper 300 in the continuous manufacturing process of cigarettes and sort defective cigarettes so that defective cigarettes can be easily extracted. According to this detection system, it is possible to detect defective smoking articles and remove defective goods prior to packing.

Accordingly, the cigarette inspection system 1 of this embodiment includes an imaging module 40 and a processing module 50. The apparatus for manufacturing the smoking articles comprises a tipping drum 10, a swash drum 20, and a conveying element (e.g. rolling drum 30). In some examples, one or more parts of the apparatus for manufacturing the smoking articles can be considered as part of the inspection system 1. Alternatively, the inspection system can be considered as only the imaging module 40 and/or the processing module 50.

As shown in FIG. 1, the tipping drum 10 is configured so as to continuously rotate. While a paper web 310 is being continuously supplied to the tipping drum 10, a cutter 11 cuts the paper web 310 at predetermined intervals, to form individual tipping papers 300.

A tipping paper 300 refers to a piece of sheet material, in particular paper, which connects the tobacco rod 200 to the filter 100. The tipping paper can be referred to generally as a wrapping material or connecting sheet material. The wrapping material generally connects a plurality of rod articles, or forms an exterior surface of a rod article. In some examples, the tipping paper 300 contains a design and a colour on a predetermined area in order to improve the appearance of the cigarette roll 200. However, the design or the like is formed on the outer surface of the tipping paper 300 but not on the inner surface of the tipping paper 300. In some aspects, the entire inner surface of the tipping paper 300 is white or has a high-brightness color. The inspection system 1 is arranged to analyse an image of the inner surface of the wrapping material (tipping paper 300).

The cigarette roll 200 can alternatively be termed a source of smokeable material. In some examples, the cigarette roll 200 comprises tobacco. The cigarette roll 200 can alternatively be termed a tobacco rod 200. In some examples, the cigarette roll 200 refers to the state in which shredded tobacco is contained within an outer wrap, e.g. rolled up using a cigarette paper. The cigarette paper can have a high whiteness and opacity in order to improve the quality of its appearance. The cigarette paper can achieve a predetermined mechanical strength. In some examples, the cigarette paper can be made of flax or wood pulp.

In the present invention, the filter 100 can be of any type suitable for a smoking article. In some examples, the filter 100 comprises tow, e.g. of cellulose acetate. The filter 100 can comprise one or more filter sections. Each filter section can have a different construction or property. For example, the filter 100 can comprise a first filter section comprising activated charcoal and a second filter section comprising tow (e.g. cellulose acetate tow) without charcoal. The second filter section can also be referred to as a tow filter section.

The filter, filter assembly, filter sections and/or source of smokable material can be referred to generally as rod articles. In some aspects, these components can be elongate or rod shaped. A plurality of rod articles can be connected by wrapping with the wrapping material (tipping paper), to manufacture one or more smoking articles.

In an example of the inspection system, the filter 100 which is inspected is not a completed filter. Instead, the inspection system is arranged to inspect a filter 100 which is in the process of being manufactured. In some aspects, the filter section 100 is configured to form the filter for two smoking articles. As such, the filter 100 is double the length of a filter for one smoking article, and is arranged to be separated (e.g. by cutting) in half at a longitudinal mid-point.

In some examples, the filter 100 refers to a filter assembly. The filter assembly for one smoking article can have a first filter section and a second filter section, for example, as a dual filter. The filter assembly can have a first activated charcoal filter section, a first tow filter section, a second tow filter and a second activated charcoal filter are connected, in particular, in that sequence. Thus, a filter on each smoking article comprises first filter section (e.g. a charcoal filter section) and a second filter section (e.g. a plain tow filter section).

The activated charcoal filter section and the tow filter section are connected to each other using a sheet material. The sheet material can be paper which wraps the surroundings thereof. The sheet material can have a substantially white colour. The first and second tow filter sections can be integrally formed or attached together as separate sections.

In some examples, the filter is an active acetate dual filter, comprising an activated charcoal filter section and a tow filter section. The activated charcoal filter section is connected to the cigarette roll (tobacco rod), and the tow filter section is at a mouth end of the charcoal filter section. Filtration material of the activated charcoal filter section is packed in a plug wrap. In some examples, filtration material of the tow filter section is wrapped in plugwrap. The charcoal filter section can be coupled with the tow filter section by an inner wrap of sheet material, e.g. paper, which in some examples extends around the plugwrap. The filter is coupled with the cigarette roll by a tipping paper.

A filter assembly is supplied in the process of manufacturing cigarettes, comprising a dual filter as described above for manufacturing two smoking articles. The filter is provided as a single rod including one or more filter sections wrapped together. The filter is moved, e.g. downwards, by a plurality of conveyor drums which rotate.

Cigarette rolls are coupled to both ends of the filter assembly that is provided in this fashion. When the middle portion of the tow filters which are in the center of the filter assembly is cut in a subsequent step, cigarettes to which a filter is attached are produced as a final product.

However, in the manufacturing process of smoking articles, various types of defects may occur while a cigarette roll and a filter are being coupled to each other by a tipping paper. It is not possible to exclude all defects by performing defect detection only on filters. Accordingly, a method enabling improved detection of defects occurring in the manufacturing process is in demand.

When two cigarette rolls 200 are coupled to both ends of the filter 100 using the tipping paper 300 and the central portion of the filter 100 is cut, two smoking articles (e.g. cigarettes) are produced.

The tipping paper 300 which is formed on the tipping drum 10 moves on to the swash drum 20. The filter 100 and the cigarette roll 200 are seated on the swash drum 20 while maintaining a predetermined interval from each other, and rotate with the swash drum.

The conveying element 30 (described with respect to the exemplary rolling drum 30) is disposed downstream of the swash drum 20. While passing through the rolling drum 30, the tipping paper 300 is wrapped around the filter 100 and the cigarette roll 200, thereby coupling the filter 100 and the cigarette roll 200 together. In this example, the tipping paper 300 has a length to manufacture two smoking articles. The tipping paper 300 wraps around the whole length of the filter assembly and extends longitudinally to wrap around both of the attached cigarette rolls (tobacco rods). Thus, both tobacco rods are attached to the filter assembly by a single piece of wrapping material, e.g. the tipping paper 300.

FIG. 2 shows a set of components, namely the tipping paper 300, the filter assembly 100 and cigarette rolls 200 disposed on the outer circumference of the rolling drum 30, for manufacturing one or more smoking articles. A plurality of sets of components are at predetermined intervals from each other. The rolling drum 30 is configured to rotate to wrap the tipping paper 300 around the filter assembly 100 and the cigarette roll 200, to couple the filter assembly 100 and the cigarette roll 200 together. The wrapping may be carried out in association with a further drum (not shown), contacting the rod articles, and causing rolling of the rod articles relative to the wrapping material to effect the wrapping.

The imaging module 40 is arranged to generate images of smoking articles or components for manufacturing a smoking article. The imaging module 40 is arranged to generate the images when the components are on the rolling drum 30. In some examples, the imaging module 40 is provided adjacent to one side of the rolling drum 30. The imaging module 40 is configured to photograph an area which includes the tipping paper 300, the filter 100 and the cigarette roll 200. The imaging module 40 records the generated images, at least temporarily. The imaging module can comprise a camera, and can be termed a camera module. The imaging module can include one or more lenses to focus light on an image sensor. In some aspects, the imaging module comprises one or more cameras. For example, imaging module comprises separate cameras to image different areas.

The tipping paper 300, the filter 100 and the cigarette roll 200 are photographed when seated on the rolling drum 30. The imaging module 40 is configured to repeatedly photograph a predetermined position on the rolling drum 30, and photographs the area in which the tipping paper 300, the filter 100 and the cigarette roll 200 are included in response to the speed at which the rolling drum 30 rotates. In some examples, the connecting sheet material is adjacent and/or affixed to the rod articles. In some aspects, the process of wrapping the connecting sheet material has not yet started, and/or is not complete, when an inspection image is generated. In some examples, the imaging module is arranged to generate an image of a partially formed smoking article. The wrapping sheet material can extend away from the rod articles, and/or does not cover the rod articles, to allow inspection of both the wrapping material and rod articles.

In some aspects, the tipping paper 300 is progressively wrapped around the filter assembly 100 and tobacco rod 200 whilst on the rolling drum 30. The imaging module 40 is configured to record an image of each set of the tipping paper, filter assembly 100 and tobacco rod 200 at the same stage of wrapping. In some aspects, a single image is generated including the tipping paper, filter assembly 100 and tobacco rod 200.

In some examples, the wrapping has not started when the image is taken. In some aspects, a leading edge of the tipping paper is affixed or adjacent the rod articles. The imaging module 40 records an image of an area of the rolling drum 30 which is fixed relative to the swash drum 20. A repetition interval of the photographing is arranged to record each set of components in the same stage of wrapping.

In some examples, the imaging module 40 comprises an image sensor. For example, the image sensor may be implemented as a charge-coupled device (CCD). The image sensor is embodied by the connection of precise capacitors (condensers) and switches such that it sequentially transmits images by accumulating charges. The image sensor can be included in a camera.

The images photographed by the imaging module 40 are processed by the processing module, e.g. by a Central Processing Unit (CPU) 50. The CPU 50 analyses and sorts the images photographed by the imaging module 40, and thus detects and determines smoking articles which are or will be defective.

With reference to FIG. 3, in an exemplary, inspection system 1 of this embodiment, the area that is photographed by the imaging module 40 can be analysed as a first area 60 and a second area 70. In the example shown, the first area 60 is an area in which the tipping paper 300 is positioned. The second area 70 is an area in which a rod article, e.g. the filter 100, is positioned. Alternatively, the first area 60 can be considered to correspond to the area on the rolling drum 30 in which the tipping paper 300 is positioned, and the second area 70 corresponds to the area on the rolling drum 30 in which a rod article, e.g. the filter 100, is positioned. In some examples, the same image is analysed in both the first area 60 and second area 70.

As shown in FIG. 1 and FIG. 2, a plurality of filters 100 extend in a circumferential direction on the rolling drum 30. The filters 100 are repeatedly placed at regular intervals in the circumferential direction of the rolling drum 30. In addition, cigarette rolls 200 are placed on both sides of each filter 100. The tipping paper 300 is also seated on the rolling drum 30 in order to couple the filter 100 and the cigarette rolls 200 together. An edge of the tipping paper is located adjacent to, or affixed to, the filter 100 and tobacco rod 200. The edge is longitudinally extending. The coupling is accomplished as the tipping paper 300 having the edge (shown as a lower end thereof) positioned close to the filter 100 wraps the filter 100 and the cigarette rolls 200 in response to the rotation of the rolling drum 30. In some examples, the tipping paper is wrapped by rotation of the filter 100 and tobacco rod 200 with contact of an adjacent drum moving relative to the rolling drum 30.

In some examples, the first area 60 is determined based on the area on the rolling drum 30 in which the tipping paper 300 is positioned, and the second area 70 is determined based on the area on the rolling drum in which the filter 100 is positioned. The imaging module 40 photographs the images of the first area 60 and the second area 70, and the processing module 50 inspects the images of the first and second areas 60 and 70, and thereby determines a defect.

The processing module 50 serves to inspect defects, which include contaminations such as foreign matter or stains, wrinkles, tears, filter omission, and the like. The processing module 50 can determine such defects by analyzing the recorded brightness on the first area 60 and/or the second area 70.

An exemplary analysis by the processing module 50 is now described.

FIG. 3 illustrates an example in which the first area 60 is divided into a first normal area 61 in which the tipping paper 300 is expected to be present in a normal state; and a first error area 62 which is around or in proximity to the first normal area 61. In the normal state, the tipping paper 300 is located in the first normal area 61. Detection of the tipping paper 300 in the first error area 62 indicates an error or problem.

The tipping paper 300 is coupled to the filter 100 and the cigarette rolls 200 within a predetermined range of error. Specifically, the tipping paper 300 is seated on the rolling drum 30 within a tolerable range (i.e. a range that is determined to be allowable), and the first normal area 61 is positioned inside the tolerable range. The area which is out of the tolerable range corresponds to the first error area 62.

In the manufacturing process, the tipping paper 300 in the normal state is positioned in the tolerable range and does not appear on the first error area 62. Specifically, the processing module 50 is configured to analyse brightness in an area to determine whether the tipping paper is present in that area. For example, when the image of the first normal area 61 is white, brightness is detected to be relatively high, e.g. above a threshold value. Therefore, wrapping material is determined to be detected.

When the image of the first error area 62 has a brightness below a threshold value, over all or a part of the area, the wrapping material 300 is determined not to be present in that area (or part thereof). The tipping paper 300 is not exposed on the first error area 62. Consequently, the color of the surface of the rolling drum 30 is detected. In some aspects, the tipping paper 300 is determined to be incorrectly positioned if the tipping paper 300 is not detected over the whole of the first normal area 61. Thus, a detection of a part only which has a brightness below a threshold value can indicate a defect. In some aspects, a defect may only be determined if the size of the low brightness area is greater than a pre-determined area. This may prevent a false error, e.g. a misreading pixel in the camera, triggering a determination of an error.

The surface of the rolling drum 30 provides an image brightness which is below the threshold value. In some examples, the color of the surface of the rolling drum 30 is black.

When the tipping paper 300 is misaligned, e.g. the tipping paper 300 is spread and disposed out of the tolerable range, part of the image of the tipping paper 300 can be detected on the first error area 62. This may occur when the tipping paper 300 is double patched, i.e. two pieces of tipping paper are provided instead of one. The tipping paper 300 can be folded and positioned on the rolling drum 30, leading to part of the image of the tipping paper 300 detected on the first error area 62. In this case, white or a brightness value above the threshold value is detected in the first error area 62.

The first error area 62 extends near or around at least one edge of the first normal area 61. For example, the first error area 62 extends around two or three edges of the first normal area, e.g. the two lateral edges and/or a circumferential edge distal from the rod articles 100, 200. In some aspects, the first error area 62 does not extend along an edge of the first normal area 61 proximal to the rod articles 100, 200, for example, between the first normal area 61 of the tipping paper 300 and the rod articles 100, 200. The first error area 62 extends in a n-shape around the first normal area 61.

In some aspects, the first error area 62 further extends on a distal side of rod articles 100, 200 to the first normal area 61. For example, the first error area 62 extends on a far side or opposite side of the filter 100 and tobacco rods 200 to the first normal area 61. The first error area 62 extends adjacent to the area expected to be occupied by the filter assembly 100 and tobacco rods 200. In some aspects, the second area is located between a part of the first error area and the first normal area.

In some examples, the first normal area 61 extends in a longitudinal direction of the filter 100 and tobacco rods 200, which is a lateral direction of the rolling drum 30. The first normal area 61 also extends in a circumferential direction of the rolling drum 30. The first normal area 61 can be rectangular in shape. The first normal area 61 comprises a majority of the area of a normal (correct) size of the tipping paper 300. In some examples, an edge of the first normal area 61 is spaced apart from a correct location for edges of the tipping paper 300. In particular, the first normal area 61 is spaced apart from an edge of the tipping paper 300 adjacent to the filter assembly 100 and tobacco rods 200. In some examples, the first normal area 61 is spaced apart from two, three or all (e.g. four) edges of the tipping paper.

In some examples, the first normal area 61 is spaced apart from the first error area 62. The first normal area 61 is spaced from the first error area 62 by a circumferential and/or longitudinal extent. In some examples, the image between the first normal area 61 and the first error area 62 is not analysed. Thus, in some aspects, an alignment of the tipping paper 300 which provides detection of the tipping paper 300 over the whole of the first normal area 61 and no detection in the first error area 62 may be determined to be a correct positioning of the tipping paper. If any tipping paper is detected in the first error area 62, then this indicates an incorrect positioning of the tipping paper.

FIG. 4 shows an example in which the tipping paper 300 is not correctly positioned. A part of the tipping paper 300 is detected in the first error area 62, indicated by area 162. The detection of any tipping paper (i.e. brightness above a threshold) in the first error area 62 is determined by the processing module 50 to indicate a problem with that set of components.

Figure 5A:
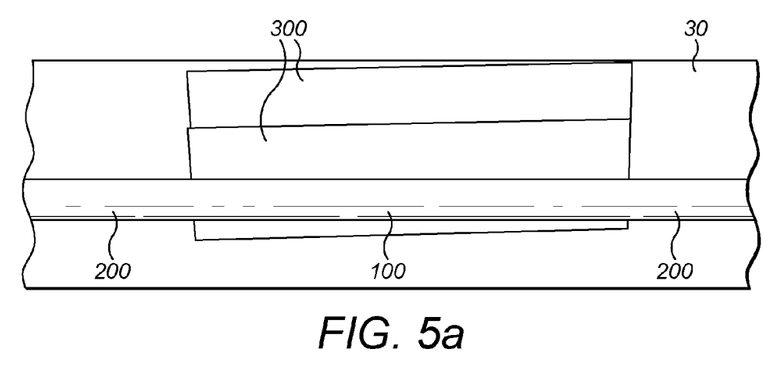
FIG. 5A and FIG. 5B show examples of a smoking article having a defect of a double patch.
Figure 5B:
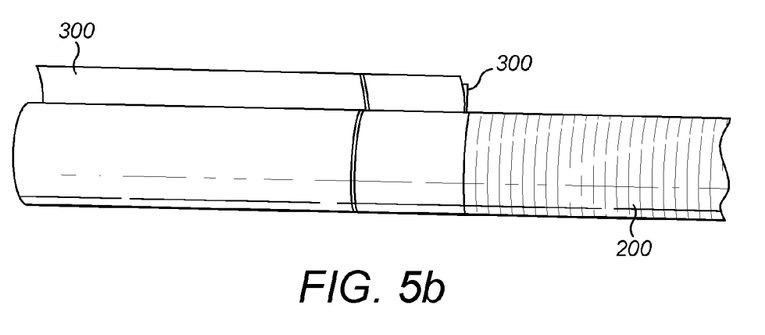

FIG. 5A shows a tipping paper 300 which is double-patched on the rolling drum 30 prior to wrapping. FIG. 5B shows a defective cigarette which has been manufactured in that state. The wrapping material has been wrapped, but the smoking article is defective since two sheets of wrapping material (double-patch) have been wrapped in one smoking article.

When the tipping paper 300 has a foreign matter defect 350, i.e. foreign matter such as a piece of tobacco is positioned on the tipping paper 300, part of the image on the first normal area 61 is detected to have lower brightness than a threshold, e.g. lower brightness than the tipping paper 300. In some aspects, the brightness can be lower than the remainder of the tipping paper 300. As such, the processing module 50 will determine a problem.

Figure 6A:
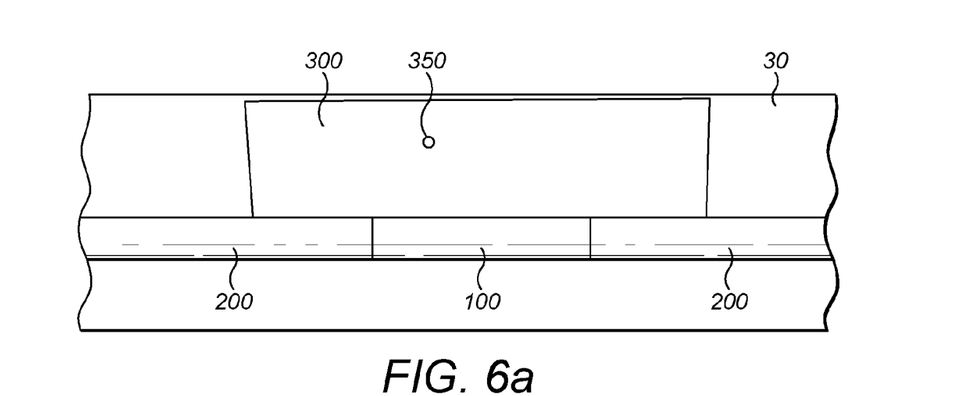
FIG. 6A and FIG. 6B show examples of a smoking article having a defect caused by foreign matter.
Figure 6B:
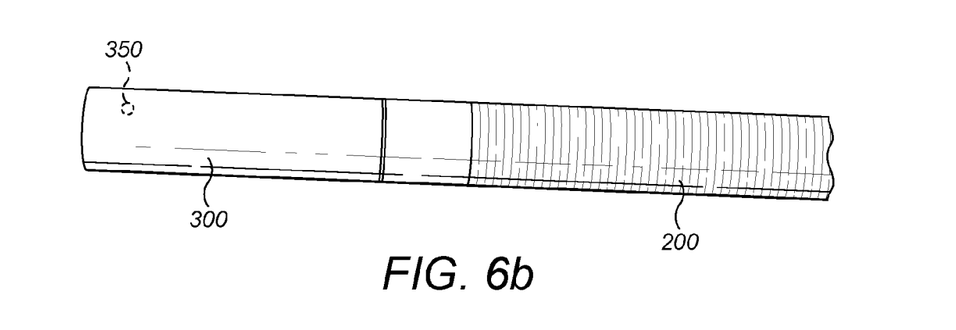

FIG. 6A shows a tipping paper 300 on the rolling drum 30 which has a foreign matter defect 350. FIG. 6B shows a defective cigarette which has been manufactured including that foreign matter defect 350.

Cigarettes which are determined to be defective can be discharged from the manufacturing process or be stored separately from normal cigarettes.

In this fashion, the cigarette inspection system 1 of this embodiment can easily detect any defects, such as misalignment, a double patch or a foreign matter defect, by detecting the image of the tipping paper 300 in the process in which the tipping paper 300 wraps the filter 100 and the cigarette rolls 200 using the imaging module 40 and the processing module 50. It is also possible to separate defective cigarettes such that the defective cigarettes can be excluded from the manufacturing process.

Referring to FIG. 4, in some examples, the second area 70 is divided into a second central area 71 which is a central portion of the second area 70 and a second peripheral area 72 which is in a periphery. In particular, the second central area 71 is substantially at a lateral centre of the rod articles and/or drum 30. The second peripheral area 72 comprises two separate peripheral areas 72, laterally spaced from the lateral centre of the rod articles and/or drum 30. The peripheral areas 72 are spaced apart from the second central area 71.

As described above, the filter 100 of this embodiment is embodied by combining activated charcoal filter sections and tow filter sections. The tow filter sections are positioned in the central portion and the activated charcoal filter sections are positioned at both sides of the tow filters. The tow filter part includes the tow filter sections and the paper which wraps the filtration material of the tow filters. The paper or sheet material on the exterior of the tow and/or charcoal filter sections is white.

The activated charcoal filter sections have lower brightness than the paper which wraps them. The external appearance of the activated charcoal filter sections is white owing to the paper which wraps them.

The exterior of the filter 100 is substantially white in a normal state. The exterior of the filter 100 can be a sheet material which wraps directly around filtration material, e.g. filtration material of the charcoal filter section and/or tow filter section. Alternatively, each filter section can comprise filtration material wrapped in a sheet material extending over only the length of that filter section. A further sheet material (e.g. paper) extends over a plurality the filter sections. For example, the charcoal filter section and/or tow filter section can comprise filtration material wrapped in separate sections of sheet material, and overwrapped with a further piece of wrapping material over the whole of the filter assembly 100. This wrapping is overwrapped with the wrapping material 300.

In some aspects, the inspection system is configured to detect the colour and/or brightness of the exterior of the filter, during or directly prior to wrapping with the tipping paper to connect to the source of smokeable material. For example, the colour and/or brightness measured by the inspection system is the exterior sheet material of the filter assembly.

In the second area 70, the plurality of regions can correspond to different rod articles or to different filter sections. For example, the second central area 71 forms part of the area in which the tow filter sections are positioned, and the second peripheral area 72 forms part of the area in which the activated charcoal filter sections are positioned. The inspection system is configured to detect a defect with at least a part of an analysed region. The defect can be determined by a change in colour and/or brightness in at least a part of the area, to identify a problem with that component. The change in colour and/or brightness can be identified as a reduction in brightness in an area of the region. The reduced brightness and/or colour can be detected over any size area to indicate a defect, or detected over at least a minimum area. The change in brightness and/or colour indicating a defect can be a change by at least a minimum amount from pre-determined (threshold) value, or from an average value of the region.

In a further embodiment, the second peripheral area 72 or a further peripheral area are arranged to align with the tobacco rod.

In the manufacturing process of the smoking articles, the rod article(s), e.g. filter 100, in the normal state is positioned in the second area 70, and white images are detected from both the second central area 71 and the second peripheral area 72.

In contrast, when the filter is polluted, e.g. the outer periphery of the filter 100 is stained with foreign matter, the brightness of the image on the second central area 71 is detected to be low by the imaging module 40 over at least a part of that area. In particular, if the second central area 71 corresponding to the tow filter section which is generally white is stained with foreign matter, the brightness of the image on the second central area 71 is detected to be low by the imaging module 40. In the present invention, the processing module 50 determines that the filter in this state is contains foreign matter.

In some aspects, a defect may only be determined on any area of any embodiment if the size of the low brightness area is greater than a pre-determined area. This may prevent a false error for a very small dark area, e.g. a misreading pixel in the camera, triggering a determination of an error.

Figure 7:
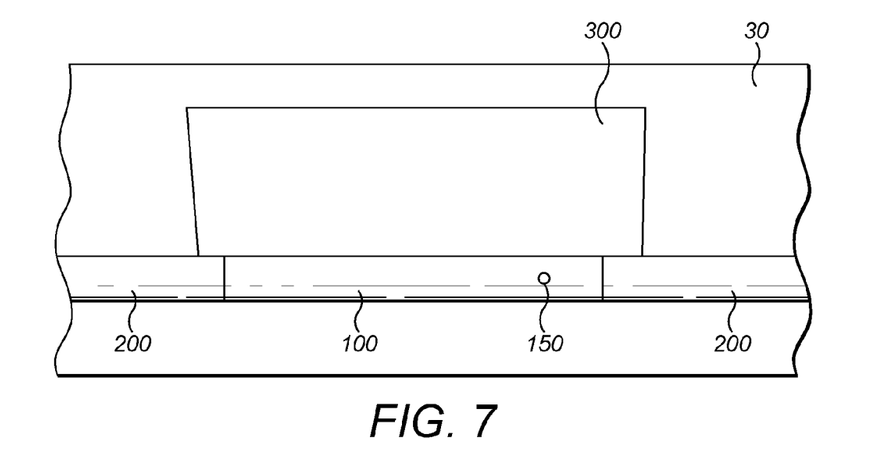
FIG. 7 shows an example of a smoking article with a filter containing foreign matter.

FIG. 7 shows a filter 100 containing foreign matter on the rolling drum 30. Additional matter 150 is inadvertently present on the filter 100.

If the filter 100 is not correctly seated on the second area 70, the processing module 50 can determine that the filter has been omitted. For example, the filter may not be correctly seated if the filter 100 is biased to one side, the filter 100 is folded or snapped, or the like; or when the activated charcoal filter section or tow filter section of the filter 100 is omitted, the processing module 50 determines that the filter has been omitted.

Specifically, when white (or a colour/brightness within a predetermined range) is not observed on all or a part of the second peripheral area 72, the imaging module 40 determines the brightness of the image on the second peripheral area 72 to be low. Thus, a defect is determined.

The brightness can be considered as low if, for example, the brightness is below a threshold of brightness, and/or an area which is considered bright is lower than a threshold area. In a possible aspect, the brightness of the second peripheral area 72 is relative to the outer circumference of the filter 100.

Figure 8:
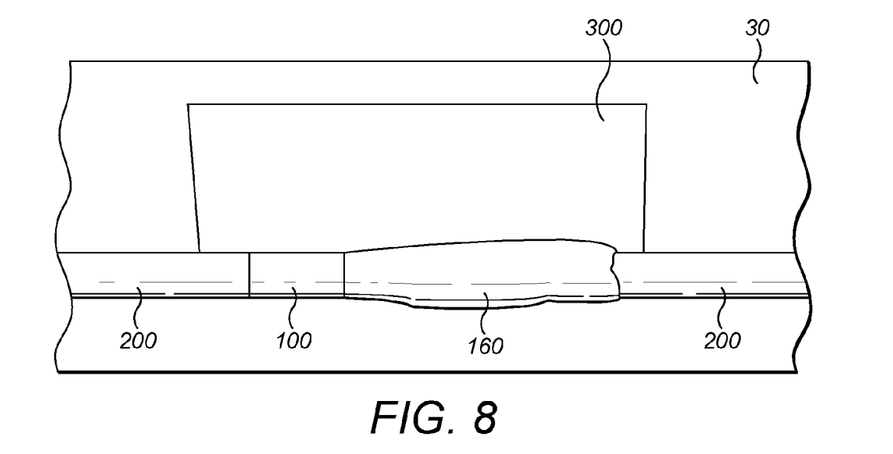
FIG. 8 shows an example of a smoking article in which filtration material has been omitted.

FIG. 8 shows an example in which tow (filtration material) has been omitted from a filter 100 in an area 160. The filtration material is not present in at least part of the filter.

Figure 9:
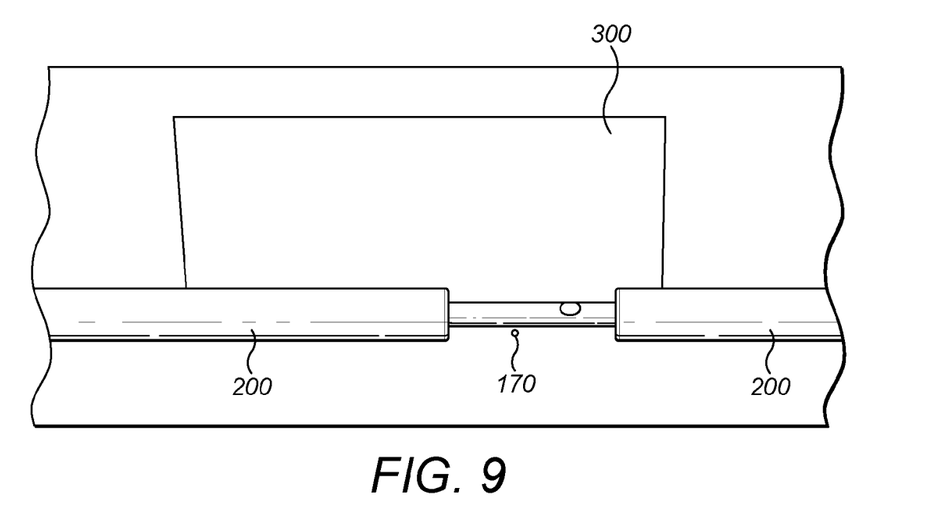
FIG. 9 shows an example of a smoking article in which a filter has been omitted.

FIG. 9 shows an example in which a filter 100 is not properly positioned on the second area 70. For example, at least a part of the filter has been omitted, indicated by area 170. In some aspects, these faults can be identified by detecting a reduced brightness in at least a part of the second area.

In some aspects, the inspection system analyses both the first and second areas of the smoking article, when the connecting sheet material is adjacent or partially wrapped. In some aspects, the first and/or second areas comprise a plurality of regions which are individually or separately analysed to determine whether a defect exists in the smoking article. In some aspects, the first and second regions are analysed differently in the first and second areas. In particular, the first and second regions of the first area (i.e. first normal area 61 and first error area 62) are analysed differently from the first and second regions of the second area (i.e. second central area 71 and second peripheral area 72). For example, the first area comprises a first region (first normal area 61) in which a high brightness (white) indicates a normal smoking article, and a second region (first error area 62) in which a high brightness (e.g. whole area white) indicates a defect. For the second area, a high brightness (e.g. whole area white) in both of the first and second regions (second central area 71 and second peripheral area 72) indicates a normal smoking article.

As set forth above, the inspection system 1 of the present invention can detect the image of the filter 100 in the process in which the wrapping material (tipping paper 300) is wrapping the filter 100 and the cigarette rolls 200 using the imaging module 40 and the processing module 50, thereby easily detecting defects, such as a filter containing foreign matter, filter omission, and the like. In some aspects, the imaging module 40 is configured to examine the wrapping material and rod articles. The connecting sheet material and rod articles are examined immediately prior to, at the start of, or during wrapping of the sheet material around the rod articles. It is therefore possible to separate a defective cigarette from a normal cigarette, so that the defective cigarette is excluded from the manufacturing process of cigarettes.

In some examples, the processing module is arranged to analyse the generated images. The processing can comprise one or more of the following stages or features, in any combination:

1) Pre-processing, which can optionally include one or more of: brightness/darkness adjustment, binary conversion and position adjustment;

2) Extraction of characteristics, which can optionally include one or more of: a point sensor (ON/OFF), line sensor (length, quantity), area sensor (area) and/or pattern matching (shape); and 3) Differentiation, which can optionally include one or more of: tolerance setting, logic operations and/or numerical operations.

The image generated by the imaging module can be a still image or a video image. The image can be digitized. In some examples, the image is digitized into two levels according to whether the brightness is above or below a threshold value. The two levels can be characterized as "White" or "Black". Alternatively, the image signal can be digitized to a gray scale, for example, comprising 256 levels of brightness. In some examples, the threshold value described above are applicable to the digitized images.

The image comprises a plurality of pixels. The pixels can be analysed individually. In some aspects, the image can be processed using adjacent pixels, for example, analysing a 3×3 area around a processed pixel. In some examples, the image can be "filter processed". Alternatively or in addition, any type of image processing can be carried out on the image(s).

Figure 10:
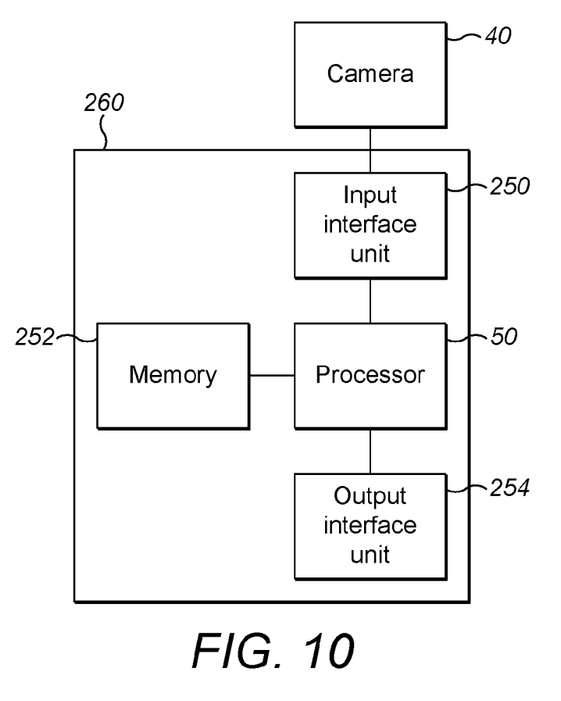
FIG. 10 shows an exemplary overview of the system of an embodiment of the present invention.

FIG. 10 shows an example overview of a system according to an embodiment of the invention. The imaging module 40 is connected to a processing module 260. The imaging module outputs image data to the CPU 50, as described above. In some examples, an input interface unit 260 of the processing module can provide an interface and/or buffering for image data between the CPU 50 and imaging module 40. The CPU 50 can be connected to a memory 252. The memory can store data or values to enable the analysis of the image data. For example, the memory can store threshold values or average values for comparison with the image data received. An output determination of the image data analysis can be communicated to an output interface unit 254. The output interface unit 254 is connected to the apparatus for manufacturing the smoking articles. The output interface unit 254 is arranged to convert the determination of the CPU 50 to a command which is recognized by the manufacturing apparatus, in order to selectively allow of prevent a smoking article to continue further with the manufacturing or packing process.

The units and modules described above are examples only, and are indicative of function. One or more units or modules can be integrally formed, or not present. Further units or modules may be included to carry out the described functions.

Figure 11:
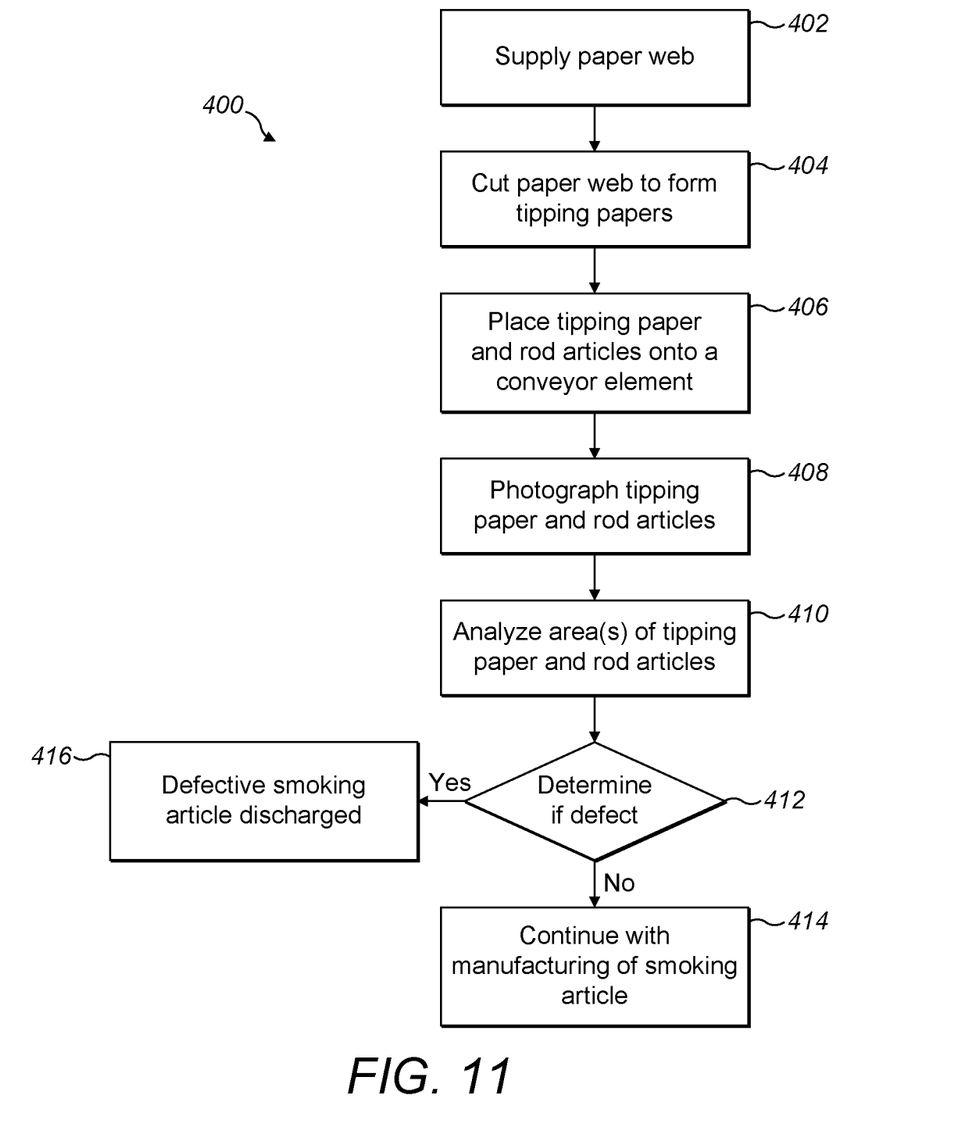
FIG. 11 shows an exemplary flowchart showing a process of an embodiment of the present invention.

FIG. 11 shows a flowchart 400 of a process according to an embodiment of the invention. The terms used are those of an example, and can be replaced by more general terms. In 402, a web of wrapping sheet material, e.g. paper, is supplied. The sheet material can be termed tipping paper. The paper is cut to form wrapping material for one or more smoking articles, in 404. The tipping paper and rod articles are conveyed onto a conveyor element, in 406. The conveyor element is arranged to receive both tipping paper and rod articles, for example, for wrapping the tipping paper around the rod articles. An image of the tipping paper and/or rod articles is recorded, in 408. The recorded image is transmitted to a processing module for analysis. The analysis determines the presence, contamination and/or correct manufacture of one or more areas on the tipping paper and/or rod articles. For example, the analysis comprises identifying areas of relatively low brightness. In some aspects, the analysis comprises detecting the presence of the tipping paper in an area which indicates a defect, e.g. as described above. The analysis determines either that the photographed smoking article is satisfactory or defective, in 412. If satisfactory, the remaining manufacturing and/or packing processes are carried out, in 414. If defective, the smoking article is removed and separated from the satisfactory smoking articles, in 416. The defective smoking article is separated immediately, or at a later stage, e.g. after the wrapping of the rod articles is carried out.

An embodiment of the invention can comprise only some of the processes described above. For example, the inspection can comprise only 408 to 412.

The examples above describe an inspection system configured to detect errors in two smoking articles being manufactured simultaneously. Alternatively, the present invention relates to an inspection system configured to detect errors during manufacturing a single smoking article. The first area is reduced in area accordingly. The second area can comprise a central area and one peripheral area.

An example of the invention describes recording an image of a rolling drum. The rolling drum can be generally referred to as a conveying element, on which rod articles are seated prior to or during wrapping with a sheet material. In some examples, one or more rod article is imaged by the imaging module.

An example of the invention describes recording an image of a rolling drum. The image is taken towards the rolling drum, and the imaged surface of the rolling drum may be covered by the tipping paper and rod articles. Therefore, the recorded image may not comprise the rolling drum itself, only the components seated on the rolling drum.

The second area has been described as corresponding to two distinct areas or regions corresponding to two different filter sections. Alternatively, the second area can comprise only one area, e.g. for imaging a smoking article comprising only one filter section. Alternatively, the second area comprises a plurality of regions for imaging different areas of a smoking article having a single filter section or for imaging different areas on a smoking article having a plurality of filter sections.

An embodiment of the invention has been described as imaging and analysing two distinct areas of the smoking article. Alternatively or in addition, the imaging module is arranged to take an image of the connecting sheet material during wrapping of the connecting sheet material around the filter. The imaging module can be arranged to image only one of the first and second area, and/or, the processing module can be arranged to analyse only one of the first and second area.

An example of the invention describes analysing an image of the wrapping of the source of smokable material and filter with a wrapping material. The filter is provided as a wrapped rod. Alternatively, the inspection can be used to detect errors in the wrapping of one or more filter sections with a wrapping material. The wrapping material is wrapped around a plurality of rod articles in the form of filter sections. Each filter section can comprise filtration material wrapped in a wrapping, which are connected together by the rod wrapping material.

Embodiments of the invention describe imaging and/or analyzing both the wrapping material and the rod articles. Alternatively, only one of the wrapping material and the rod articles are imaged and/or analysed. The wrapping material or rod articles can be analysed in one, two, three or more areas to determine a defect. Alternatively, the imaging is carried out using two cameras or imaging modules, each arranged to generate a separate image. The images can be analysed separately. The processing module can be arranged to analyse one image at once, or analyse more than one image in parallel.

While the present invention has been described and shown with respect to the specific embodiments, it will be apparent to a person having ordinary skill in the art that various modifications and variations may be made without departing from the scope of the invention. Therefore, such modifications and variations should not be construed as being separate from the technical and scope of the invention, and it should be understood that such modified embodiments fall within the scope of the claims of the invention.

In order to address various issues and advance the art, the entirety of this disclosure shows by way of illustration various embodiments in which the claimed invention(s) may be practiced and provide for superior inspection of tobacco products.

The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future. Any feature of any embodiment can be used independently of, or in combination with, any other feature.

The invention claimed is:

1. A system comprising:
a machine for manufacturing a smoking article, wherein the machine comprises
a rotatable tipping drum to which a tipping paper web is continuously supplied, a cutter to cut the tipping paper web at predetermined intervals to form individual tipping papers and, a conveying drum configured to receive a plurality of sets of rod articles and convey them in a direction perpendicular to the longitudinal axis of the rod articles, each set of said plurality of sets of rod articles also receiving an individual tipping paper for wrapping and coupling the rod articles of each set together as the conveying drum rotates; and
an imaging module positioned relative to the conveying drum to generate an image of the rod articles and individual tipping paper of each set whilst being seated on said conveying drum and before wrapping of the set of rod articles by the individual tipping paper is complete; and,
a processing module configured to process images generated by the imaging module, wherein the processing module is configured to analyse images in a first area in which the individual tipping paper is positioned, and, determine a defect in the position of the individual tipping paper of a set imaged by the imaging module by analysing the first area.

2. The system of claim 1, wherein the processing module is configured to analyse images in a second area in which a said rod article is positioned, and, to determine a defect by analysing the second area.

3. The system of claim 2, wherein the second area is located between a part of the first error area and the first normal area.

4. The system of claim 2, wherein the processing module is configured to determine a defect when part of the image of the second area has a different brightness than the image of the rod articles, or has a different brightness to a threshold value or range, and optionally determines a defect when part of the image of the second area has a lower brightness than a threshold value.

5. The system of claim 2, wherein a said rod article comprises a filter having a plurality of filter sections, and a plurality of regions of the second area are arranged to correspond to different filter sections.

6. The system of claim 2, wherein the second area comprises a second central area which comprises a central portion of the image of the second area and one or more second peripheral area which comprises a peripheral portion of the image of the second area.

7. The system of claim 6, wherein the processing module determines a rod article omission when all or part of the image of the second peripheral area has a lower brightness than a threshold value indicating a normal rod article.

8. The system of claim 2, wherein the processing module determines a defective rod article when all or part of the image of the second area has a lower brightness than a threshold value indicating a normal rod article.

9. The system of claim 1 wherein the first area or second area comprises a plurality of regions which are individually analysed to determine a defect.

10. The system of claim 9 wherein at least two of said plurality of regions are spaced apart.

11. The system of claim 1, wherein the first area is divided into a first normal area and a first error area, wherein detection of the individual tipping paper in the first normal area indicates a normal state.

12. The system of claim 11 wherein the first error area extends around at least one side of the first normal area, and optionally, the first error area extends around at least three sides of the first normal area, and optionally, the first error area extends around all sides of the first normal area.

13. The system of claim 1, wherein the first area is divided into a first normal area and a first error area, wherein the processing module determines a defect when a part of the image of the first error area comprises the individual tipping paper.

14. The system of claim 1 wherein the processing module determines a defect when part of the image of the first normal area or a region of the first area has a lower brightness than a threshold value.

15. The system of claim 1 wherein the imaging module is arranged to record an image of the smoking article during manufacture and after:
a tipping drum on which a sheet material web is cut at predetermined intervals, thereby forming wrapping materials; and
a swash drum which supplies a filter and a source of smokable material which are seated on the swash drum while maintaining a predetermined interval from each other.

16. A method of inspecting smoking articles during manufacture of said smoking articles on a machine for manufacturing said smoking articles, the machine comprising a rotatable tipping drum to which a tipping paper web is continuously supplied, a cutter to cut the tipping paper web at predetermined intervals to form individual tipping papers and, a conveying drum configured to receive a plurality of sets of rod articles and convey them in a direction perpendicular to the longitudinal axis of the rod articles, each set of said plurality of sets of rods articles also receiving an individual tipping paper for wrapping and coupling the rod articles of each set together as the conveying drum rotates, wherein the method includes:
positioning an imaging module relative to the conveying drum to generate an image of the rod articles and individual tipping paper of each set whilst being seated on said conveying drum and before wrapping of the set of rod articles by the individual tipping paper is complete; and,
analysing the area of the image taken by the imaging module in a first area in which the individual tipping paper is positioned; and
determining a defect in the position of the individual tipping paper of a set imaged by the imaging module by analysing the image on the first area.

17. An inspection system for a smoking article manufacturing machine, comprising:
a rotatable tipping drum to which a tipping paper web is continuously supplied,
a cutter to cut the tipping paper web at predetermined intervals to form individual tipping papers,
a conveying drum positioned to receive a plurality of sets of rod articles and convey them in a direction perpendicular to the longitudinal axis of the rod articles, each set of said plurality of sets of rod articles receiving an individual tipping paper for wrapping and coupling the rod articles of each set together as the conveying drum rotates;
an imaging module positioned relative to the conveying drum to generate an image of the rod articles and individual tipping paper of each set while being seated on said conveying drum and prior to completion of wrapping of the set of rod articles by the individual tipping paper;
a processing module including a processor having software stored in memory, the software executing on the processor and operable to process images generated by the imaging module,
wherein the processing module is configured to analyze images in a first area in which the individual tipping paper is positioned, and,
determine a defect in the position of the individual tipping paper of a set imaged by the imaging module by analyzing the first area.

* * * * *